Dec. 17, 1968     F. H. STITES ET AL     3,417,231

MARK SENSING SYSTEM

Filed July 30, 1964     5 Sheets-Sheet 1

INVENTORS
FRANCIS H. STITES
BRADSTREET J. VACHON

BY

ATTORNEY

Dec. 17, 1968  F. H. STITES ETAL  3,417,231
MARK SENSING SYSTEM
Filed July 30, 1964   5 Sheets-Sheet 2

INVENTORS
FRANCIS H. STITES
BRADSTREET J. VACHON
BY
*Spencer E. Olson*
ATTORNEY

United States Patent Office 3,417,231
Patented Dec. 17, 1968

3,417,231
MARK SENSING SYSTEM
Francis H. Stites, Wayland, and Bradstreet J. Vachon, Framingham, Mass., assignors to Sylvania Electric Products Inc., a corporation of Delaware
Filed July 30, 1964, Ser. No. 386,328
9 Claims. (Cl. 235—61.11)

ABSTRACT OF THE DISCLOSURE

A coded vehicle identification system including a acceptance gating arrangement for preventing signals other than those derived as a result of scanning a retroreflective data-encoded label affixed to a vehicle from being processed. The signals derived from the scanning operation are stored in storage registers and then tested by the acceptance gating arrangement to determine whether they were derived from the label alone. More particularly, the signals are tested to determine whether they occur within a predetermined period of time which is substantially equal to the expected duration of signals derived from a properly-scanned label. If the signals do occur within the predetermined duration, they are transferred from the storage registers to appropriate output apparatus.

---

This invention relates to automatic mark sensing systems and more particularly to electro-optical mark sensing systems especially useful for identifying railroad cars.

In the railroad industry, freight cars are transported throughout the North American continent and a particular car may be away from the home railroad for months or even years at a time. To keep account of these cars, each railroad must maintain elaborate records of the location, routing, and identifying numbers of their cars and must exchange accounts with other railroads. Initial recording of the cars is generally accomplished by the laborious and inaccurate means of manually listing the car number, the railroad name and other pertinent information for each car in a train consist before the train leaves the yard. In some instances, closed circuit television has been employed wherein an operator in a control booth of a switch yard notes the identity of cars passing a television camera located in the yard. Although this method offers some improvement over the manual method, this system still depends on a human operator and is subject to the attendant clerical errors. In addition, the operability of this system is limited in poor weather conditions such as rain, snow, or fog.

Various automated means for identifying railroad cars have been suggested from time to time; however, these means have failed to satisfy the requirements of a commercially acceptable system by reason of cost, complexity, or poor operation under practical environmental conditions. Previously suggested techniques for car identification have employed electromagnetic, radioactive, sound, or optical sensing of appropriately-coded indicia. In a known magnetic system, a bar of magnetizable material having coded notches therein is fastened to the undercarriage of a car where it is sensed by a transducer located between the tracks. This scheme suffers major disadvantages, one being the cost of the coded bar and the cost and time expended in securing the bar to the car, usually by welding. Furthermore, the transducer must be within a few inches of the coded bar to obtain proper operation, which necessitates placing the bar close to the ground, such as under the track, where it is subject to extreme vibration. Moreover, as the car can sway several inches laterally, the bar may not be in a position to be sensed by the transducer.

Another known system employs a series of precisely tuned piezoelectric crystals mounted beneath a car a few inches from the ties wherein the transducing apparatus is located. Each crystal responds to an interrogating signal with a particularly tuned return signal which represents a coded digit. The car is identified by interrogating the crystals with a signal transmitted from the transducing apparatus and noting the frequencies of the signals returned by the crystals. Although academically this system operates as intended, its commercial potential is seriously limited by certain deleterious features. Frst of all, the crystal designator is relatively expensive and extremely delicate, thus making it impractical for use on hundreds or thousands of railroad cars. In addition, the designator must be mounted beneath the car, which can not easily be done without taking the car out of service and installing the designator in a service shop. Furthermore, complex receiving circuitry is necessary to decode the signals returned by the crystals since these signals are at a plurality of closely-spaced frequencies. Thus, this technique does not lend itself to an easily installable, trouble-free and relatively inexpensive system.

Several optical systems have been evolved which generally employ a coded label located on the side of the railroad car which is optically scanned by apparatus located at trackside. In optical systems heretofore proposed, the labels have been coded by either black and white stripes which indicate the presence or absence of a numeral in an appropriate code, or by colored stripes wherein the information is represented by suitable color combinations. In some of these systems, the particular code utilized requires an extremely large label, three to four feet in length, in order to represent the requisite information, which, of course, increases the cost of the label and makes it unwieldy to apply to a car. These known systems have not been extensively tested in the field and even those tested in the laboratory have not proven to be sufficiently accurate or reliable to be commercially attractive. A deficiency of all of these systems is the use of the railroad car motion to cause scanning of the coded label. Since the car can be moving at widely-varying speeds, the information being read from a passing label is returning at similarly widely-varying rates, requiring complex circuitry to suitably time the decoding circuits to enable decoding of the label information. In addition, since a car can be moving in either a forward or backward direction, the label code must either be chosen to read identically in both directions, or suitable logic circuitry must be incorporated in the label reading apparatus in order to sense the correct reading direction as a label passes the reader.

A label reading system wherein most of the deficiencies of the prior art were overcome has been previously disclosed in a copending application S.N. 137,918, of Francis H. Stites and Raymond Alexander, filed September 13, 1961, now Patent No. 3,225,177, and assigned to the assignee of the present application. This previous system employed optical scanning of a retro-reflective label, as does the present system; the present system, however, incorporates features developed as a result of judicious study of operating problems encountered in practice.

It is, therefore, a primary object of the present invention to provide an improved label reading system. Other objects are to provide: a label reading system which is independent of the rate of label motion past the reader; a system which is compatible with a five-position teletypewriter code; a label format which permits decoding circuitry of minimum complexity; a combination label format and scanning technique which permits variation in label location and in separation of the label digits thereby allowing labels to be affixed to railroad cars having various physical obstructions upon their surfaces;

an acceptance gating arrangement for determining whether signals derived as a result of the scanning operation are properly those produced by the label under scan; and, an improved label having a useable life of many years and which can be read under all types of climatic conditions.

In accordance with the present invention, an inexpensive, judiciously-coded label is employed with a highly reliable, relatively-simple label reader to provide a unique, commercially-feasible label reading system. The label consists of stripes of orange, blue, black and white retro-reflective material arranged in accordance with a two-position base-four code by various two-stripe combinations of orange, blue, white and black stripes to represent start and stop signals and alpha-numeric figures, and are mounted in a vertical array of horizontally-oriented stripes on the side of the vehicle. As is well known, retro-reflective material reflects substantially all the light impinging upon it back along the path of incidence. A trackside optical reading unit vertically scans a beam of light across the coded label affixed to the side of a railroad car, the retro-reflected light from the label being directed back to the reading unit where it is translated into coded information representative of data contained in the label.

The trackside reading unit includes a source of light and a rotating drum with a plurality of mirrors mounted around its periphery. As the drum rotates, the mirrors cause a light beam to vertically scan the label, and the reflected light is divided by a dichroic optical system into orange and blue light which is applied to respective sensors, the output signals of which are suitably processed to provide the requisite decoded information. The signals appearing at the output of the sensors are coded pulses representative of the particular label figures read by the scanner. It will be noted that the label is scanned vertically, as opposed to the horizontal scan of conventional systems, making the scan rate independent of the speed of the passing train, thus simplifying the processing of the coded signal.

The coded pulses are transmitted via coaxial lines to the decoding circuitry which is, typically, located at a control station some distance from the track. The received pulses are normalized to produce pulses of standard amplitude and widths to facilitate subsequent processing. After normalization, the pulses are operated upon by decoding circuitry which tests the coded information to assure the presence of a label, as distinguished from noise pulses. Once the coded information is determined to be that derived from a label, the information is decoded and converted into a five-position teletypewriter code so that commercially-available teletypewriter links can be used to transmit the label data to remote locations. Wheel counting apparatus is provided which, in conjunction with the decoding circuitry, indicates an unlabeled car or an unreadable label.

The label reading system, as any sensitive information retrieval system, must function in the presence of noise, both background or internally generated, which if random, will sometimes resemble a desired signal causing an error in the system output. To reduce the false reading rate, the system must be designed to minimize self-generated noise as well as to discriminate against background noise. Since the signal pulses may be considerably distorted by the environment in which the system operates, accurate decoding of these pulses is made extremely difficult if not impossible. It is, therefore, imperative to minimize the distortion encountered by the signal pulses before decoding is attempted. A significant feature of the system is tha essentially all distortion is removed and standardized pulses are produced which greatly expedite data processing and allows label reading with essentially zero error rate.

In practice, the system must operate under wide variations in ambient light caused by varying brightness of the day, reflections from snow and rain, and the color of foliage within the view of the trackside scanner. In addition, reflections from the side of a railroad car may vary appreciably in intensity due to different surface reflectivities of the car. For example, reflections from a stainless steel passenger car would obviously be more intense than from a faded rust-colored freight car. Also, the surface reflectivity of railroad cars is affected by dirt and grime. The output voltage of the sensors varies in accordance with the amount of ambient light received, as well as with signal light reflected from the scanned label. Accordingly, the output voltage of the sensors appears as a varying DC level added to the signal pulses caused by the light reflected from the label. The amplitude of this varyinging DC level or base line may vary over a range of 10:1 or more. Decoding of the coded pulses is made extremely difficult, if not completely impractical, by the presence of this widely-varying base line.

In order to expeditiously process the pulse information, all of the pulses should originate from a base line which is maintained at a substantially constant level. The variable base line is removed and the signal pulses restored to a constant level by a DC restoration circuit which employs a negative feedback technique to provide improved dynamic range and fidelity. This DC restoration circuit is described in a detail in copending application S.N. 329,805, of Christos B. Kapsambelis, filed Dec. 11, 1963, Patent No 3,328,590, and assigned to the same assignee as the present application. In brief, the DC restoration circuit detects the base line variation of a received signal, and an inverted version of the detected base line component is fed back to the input of the circuit whereby the varying base line component is canceled, causing the signal pulses to appear at the circuit output at a constant level. Significantly, the signal pulses are not appreciably distorted after restoration, as they often are in conventional DC restorers, and the present circuit has a greater dynamic range, of the order of 100:1, than conventional circuits.

Another complicating factor encountered in practice is the wide dynamic range of signals returned from the label, and the widely-varying rise time of the pulses caused by varying distance between the label and the scanner due to vibration or swaying of the car as it passes the scanner, changes in optical focussing, irregularities or damage to the label due to dirt or weathering, or misalignment between the label and the optics. In order to suitably decode the signal pulses to determine the label information, it is necessary to measure the pulse width of each coded pulse, which measurement is complicated by the above-mentioned factors. Since the distance between half-amplitude points on the leading and trailing edges of a pulse is independent of rise time or amplitude of the pulse, it has been found that a pulse of standard amplitude and width corresponding to the mid-amplitude width of a signal pulse can be produced to facilitate subsequent processing.

Data processing is further complicated by the fact that the signal amplitude does not always return to zero between closely spaced pieces of data. It will be remembered that the coded digits are represented by two-stripe combinations of retro-reflective material, some digits being represented by a combination of white with either blue or orange stripes. In these cases, the light reflected from the white stripe is of higher intensity than from the colored stripe, because of its greater reflectivity, causing the amplitude of that portion of the signal associated with the white stripe to be greater than the amplitude of the signal portion due to the colored stripe. As a result, the signal representing the two-stripe combination appears as a double-peak pulse, with the "white" portion being of greater amplitude. The width of the major peak of such pulses can easily be misread as the width of the entire pulse, thereby causing error in the reading of that particular digit. The amplitude of the portion of the signal associated with the white stripe can be reduced to approximately the amplitude of the signal from the colored stripe by reducing the reflectivity of the white stripe by means of black, non-reflective spots applied to the white stripe in a checkered pattern. The pulse from a two-stripe combination having a white portion is, therefore, of approximately uniform amplitude thereby lessening the possibility of error in reading that particular digit.

Non-return-to-zero can also be caused by high levels of background illumination in combination with dirt of certain kinds on the label. In the label, each two-stripe combination of coded digits is separated from the next combination by a black stripe which ideally does not reflect a significant amount of light back to the reader. However, reflections from the black stripes are sometimes caused by dirt acted upon by high ambient light, which causes spurious signals which can be of greater amplitude than the wanted signals from a colored stripe. These spurious reflections can cause errors in the decoding of the label information. To prevent such errors in signal processing, unwanted signals are suppressed by selective adjustment of the circuit sensitivity such that unwanted signals are rejected between data bits, but wanted signals are passed unimpaired.

The pulse width measurement is accomplished by means disclosed in a copending application S.N. 331,990, of Francis H. Stites, filed Dec. 18, 1963, now Patent No. 3,299,271, and assigned to the same assignee as the present application. In brief, a delayed version of the signal pulse is compared with a time-expanded half-amplitude version of the signal pulse and an output pulse derived in response to the delayed pulse crossing the expanded pulse. The expanded pulse acts as a threshold in a comparator circuit which is triggered by the delayed full-amplitude pulse. In this manner, an output pulse of arbitrary amplitude is produced having a width equal to the mid-amplitude width of the input signal pulse. Low-amplitude spurious signals occurring before and after the signal pulse and ineffective to produce output pulses from the comparator since the threshold, which is above the level of these spurious signals, exists both before and after the signal pulse to prevent passage of the spurious signals.

Any short noise pulses which may be present between signal pulses are eliminated by an integrating circuit which, in effect, subtracts 10 microseconds from each signal pulse entering the decoding circuitry. Additional decision circuitry in the decoder, including an acceptance gating arrangement for determining whether the signals derived as a result of the scanning operation are those derived from a label under scan, prevents signals other than those derived from a label from being processed.

Other objects, features and advantages of the invention and a better understanding of its construction and operation will be had from the following detailed description, taken in conjunction with the accompanying drawings in which:

FIG. 3a is a diagrammatic representation of the optical system and electrical transducers used in the scanning unit employed in the mark sensing system of FIG. 1;

FIG. 3b is a plan view of a partially silvered mirror useful in the optical system of FIG. 3a;

FIG. 3c is a plan view of an optical mask useful in the optical system of FIG. 3a;

GENERAL DESCRIPTION

Figure 1:
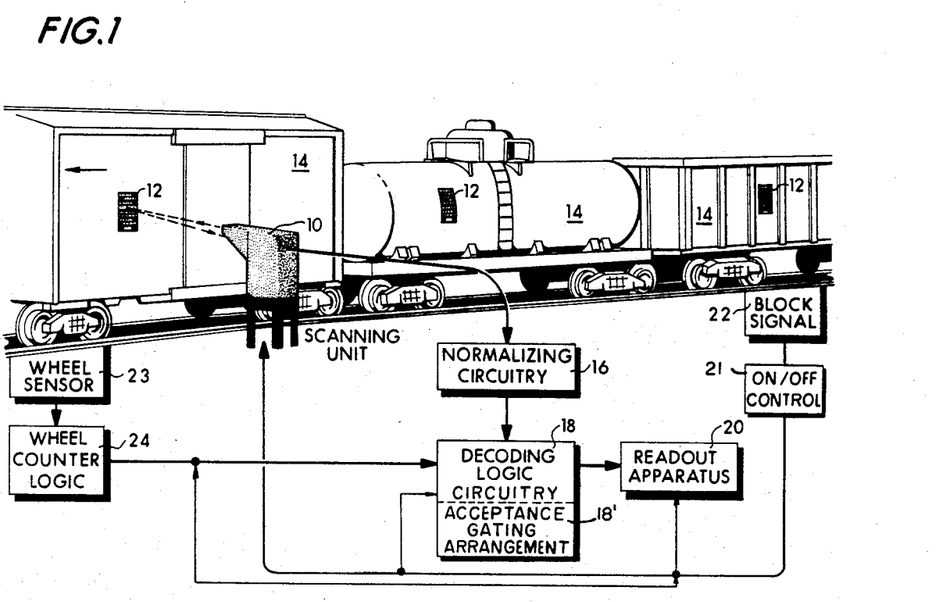
FIG. 1 is a diagrammatic representation of a mark sensing system according to the present invention.

An embodiment of the invention is illustrated diagrammatically in FIG. 1, wherein a light beam from a trackside scanning unit 10 is caused to repetitively vertically scan a label 12 affixed to the side of a railroad car 14. Light reflected from the label is received by the scanning unit 10 and is transduced into electrical signals which are applied to normalizing circuitry 16 which removes essentially all distortion and provides standardized pulses representative of the coded label information. The standardized pulses are decoded by decoding logic circuitry 18 the output signal of which operates a readout apparatus 20, such as a teletypewriter printer. As shown in FIG. 1, the decoding logic circuitry 18 includes an acceptance gating arrangement 18' which causes the decoding logic circuitry 18 to apply output signals to the readout apparatus 20 only when the signals derived from the scanning operation have been determined to be those derived from the label 12 only. The scanning unit 10 can be several feet from the track and typically scans a vertical distance of about six feet. Thus, a label can be placed on the car anywhere within this six foot height and still be read.

The system is in a de-energized condition until a train enters the signal block within which the scanner is located. At this time a command from a block signal 22, which is a standard item of railroad signalling equipment, actuates the trackside scanning unit 10 and the associated electronics via an ON/OFF control 21. A wheel sensor 23 and wheel counter logic 24 are employed to provide information to the decoding logic circuitry 18 and the readout apparatus 20 concerning unlabeled or unreadable cars. The normalizing circuitry 16, the decoding logic 18, and the readout apparatus 20 are usually located remote from the trackside scanner and are serviced by a transmission line link. The signal data rate in a practical embodiment is below 65 kilocycles per second so that no compensation or amplification is needed for cable runs up to about two miles. The only equipment in the scanning unit 10 is the scanning apparatus, the associated optics and sensors, and emitter followers used to transform the sensor signals to a low impedance.

A detailed description of each component of the label reading system will be given under appropriate headings below.

LABEL

Figure 2:
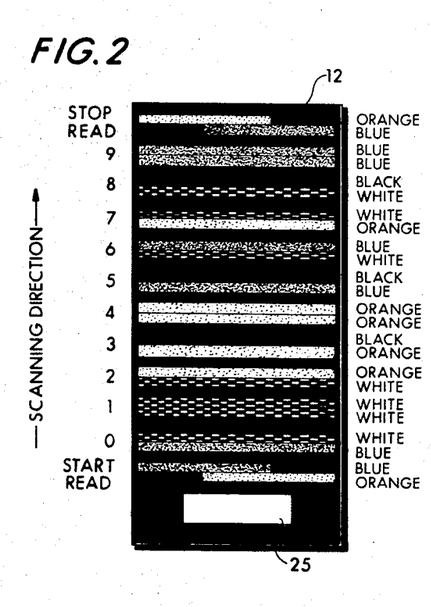
FIG. 2 is a representation of the label format used in the invention.

The label 12 is fabricated from pressure-sensitive adhesive-backed retro-reflective material, such as that sold commercially under the trademark "Scotchlite" by the Minnesota Mining and Manufacturing Company. Information identifying the car is coded by two-stripe combinations of orange, blue, white and black stripes arranged in a vertical succession of horizontally-disposed stripes. Each bit of information is represented by two stripes in various combinations of these colors; thus, a two-position base-four code results. This code achieves a considerable saving in label size over the more common binary type code. As seen in FIG. 2, the label 12 includes, from bottom to top, a "Start Read" code, encoded decimal numbers one through zero, and a "Stop Read" code, and is scanned vertically from bottom to top by the scanning apparatus. In addition, a wide white stripe 25 is provided on the bottom of the label before the "Start Read" code, the function of which is to clear the decoding logic circuitry 18 (FIG. 1) of spurious information which may be present before the reading cycle starts, as will be further explained under the discussion of the processing circuitry.

The orange and blue stripes reflect light in the orange and blue spectrum, respectively, while the white stripes reflect light in both the orange and blue spectrum. The black stripes do not reflect significantly; however, the absence of reflected light is utilized in the label code along with the orange, blue, and white light returns, to effectively provide four colors. The black stripe is utilized in the label code only for the second stripe of the two-stripe combination since system timing pulses are initiated by the light reflected from the first stripe in every two-stripe combination. It will be noted that the "Start Read" and "Stop Read" code utilize blue and orange stripes, while data is represented by blue or orange stripes in combination with white or black.

As will be more fully explained below under the heading "Scanning Optics", only the orange sensor responds to light reflected from the orange stripes, only the blue sensor responds to light in the blue spectrum, and both sensors respond to light reflected from the white stripes. Thus, particular bits of information are distinguished by the corresponding coded signals produced by the sensors.

The amplitude of the light reflected from the white stripes is greater than that reflected from the orange or blue stripes, causing the signals produced by the sensors in response to white light to be of correspondingly greater amplitude. In order to equalize the amplitude of sensor signals for colored and white light, and thus simplify the normalizing circuitry, an attenuator is provided for the white stripes in the form of a sufficient number of black dots superimposed over the white stripes to reduce the reflectivity of these stripes to essentially equal that of the colored stripes.

In a system which has operated satisfactorily, the stripes are each six inches long and 3/8 inch wide, and the spacing between paired stripes is 1/2 inch. The coded stripes are surrounded by a black, non-reflective border, and each coded digit or instruction is separated from adjacent ones by a non-reflective stripe. This prevents unwanted reflections from the surface of a railroad car, especially stainless steel or aluminum cars, which may cause spurious signals which could falsely trigger the processing circuitry. The "Start Read" and "Stop Read" stripes are each four inches long and overlap each other by two inches as shown so that reading is not initiated until approximately two inches of the label is in view of the scanner, since a reflection from both stripes is required to enable the decoding logic circuitry 18. Thus, only the central portion of the vertical array of stripes is "read." Consequently, if the vertical edges of the label are tattered or otherwise deteriorated, the scanned information is not affected since reading does not begin until both stripes of the "Start Read" code are scanned.

It is important to maintain uniform the relative brightness of the stripes comprising a coded digit. This is accomplished by fabricating each coded digit from a common piece of white retro-reflective material and then silk screening the color on as needed. In this manner, variations in brightness caused by variations in different base material are eliminated. Variations in brightness between consecutive numbers is not critical.

SCANNING OPTICS

Figures 3A, 3B, 3C:
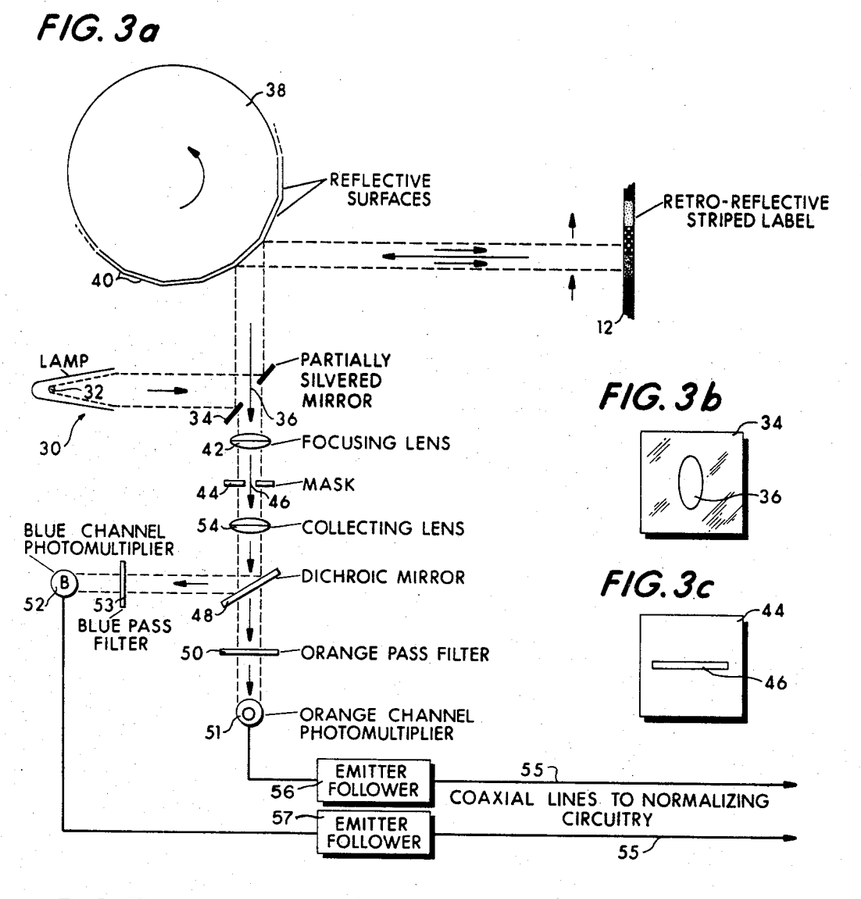

FIG. 3a is a diagrammatic representation of the optical system and the electrical transducers incorporated in the scanning unit 10 of FIG. 1. The light source 30 includes a relatively powerful lamp 32 capable of producing white light having radiation in the spectral regions to which the retro-reflective orange and blue stripes of the label are sensitive. A standard 6 volt, 100 watt PAR-36 spotlight of the type used for aircraft traffic signals produces satisfactory illumination. Light from the lamp 32 is directed toward a partially-silvered mirror 34 which has an elliptical hole 36 in the center thereof. The elliptical hole, seen more clearly in FIG. 3b, presents a circular transmission path for return light reflected from the label 12, since the diagonal disposition of the mirror 34 in the equipment converts the ellipse into an effective circle with respect to the return light path.

Scanning is provided by a scanning wheel 38 having a plurality of mirrors 40 located around the periphery. In the instant system, fifteen mirrors are employed to provide a scanning angle of approximately 48° between half-amplitude points. Half-amplitude points occur when the center of the beam of light from the partially-silvered mirror coincides with the junction between two adjacent mirrors on the scanning wheel. In other words, as the wheel rotates, half-amplitude points occur as each successive junction passes the center of the light beam. As the scanning wheel 38 rotates, from one junction to another, the angle of any mirror relative to a fixed line changes by 24°. Therefore, the angle of the light beam reflected from the mirror toward the label changes by 48° (2×24°) between successive half-amplitude points. To provide a margin of safety against errors that might occur due to vibration or misalignment of the scanner and optical system, only about 40° of the scan angle is utilized in practice. The wheel 38 is fourteen inches in diameter, rotates at 1200 revolutions per minute, and is located approximately six feet from the passing cars. If a train carrying the label 12 is moving at 60 miles per hour, the scanned area moves sideways about 3.3 inches between scans, and during the period that the scan is traversing the label, the car moves approximately 0.6 inch. Thus, a six-inch wide label will be scanned several times as it passes the scanner at speeds up to 60 miles per hour. The field of view is constrained to ten inches in the horizontal direction and less than a label stripe in the vertical direction so that the reflection from only one stripe at a time is seen while the field of view is centered on the stripe.

This selective examination of the label is accomplished by a focussing lens 42 which projects an image of the label area under scan upon a mask 44. This mask (shown more clearly in FIG. 3c) has a slit 46 therein which is approximately 0.5 inch long and .010 inch wide to accommodate the ten-inch view referred to above and insures that the light passing through the mask at any one time will be less than that reflected from any one stripe. In this manner, with proper gating, the information return is sampled from only one stripe at a time.

The light coming through the mask 44 is divided into blue and orange components by a dichroic mirror 48 which transmits orange light through an orange pass filter 50 to an orange channel input photomultiplier tube 51, and reflects blue light through a blue pass filter 53 to a blue channel input photomultiplier tube 52. A collecting lens 54 disposed between the mask 44 and the dichroic mirror 48 insures that the respective light beams will be directed to the sensing surfaces of the photomultipliers 51 and 52. The photomultiplier tubes 51 and 52 produce pulses coded in accordance with the light pulses received thereby. These pulses are applied to respective emitter followers 56 and 57 which transform the signals to a low impedance for suitable transmission over coaxial cables 55 to a remote station for further signal processing.

NORMALIZING CIRCUITRY

Figures 4, 9:
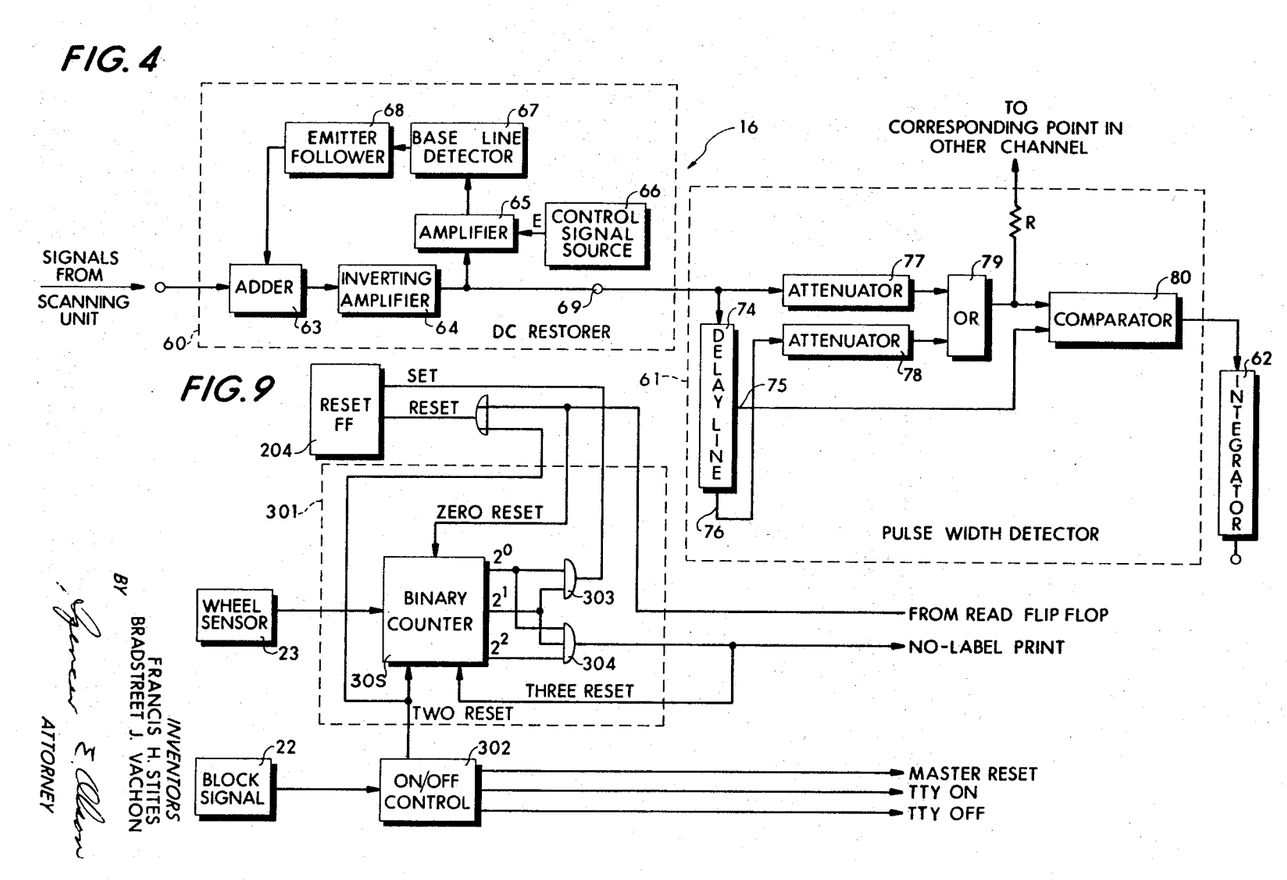
FIG. 4 is a block diagram of the normalizing circuitry employed in the mark sensing system of FIG. 1.
FIG. 9 is a block diagram showing in greater detail the wheel counter logic employed in the apparatus of FIG. 8.

To eliminate distortion caused by spurious reflections and to provide a standardized signal to facilitate data processing, as discussed hereinbefore, the signals from the scanning unit 10 are applied to the normalizing circuitry 16 illustrated in FIG. 4, which includes a DC restorer 60, a pulse width detector 61, and an integrator 62. The coded pulse train from the scanning unit 10 is applied through an adder 63 to an inverting amplifier 64, the output of which is 180° out of phase with respect to the input signal. The output of the amplifier 64 is applied to a second amplifier 65, to which is also applied a control signal E which is derived from the DC level of the signals from the scanning unit 10. The control signal E, illustrated as coming from the control signal source 66, is of a suitable amplitude such that the amplifier 65 is biased to amplify only the base-line region of the signal. The control signal E also adjusts the quiescent operating level of the feedback signal and hence the DC level of the output signal. The output of the amplifier 65 is applied to a base line detector 67 which detects the amplified base line variations of the signal. The detected base line signal is applied through an emitter follower 68, which transforms the impedance of the signal, and through the adder 63, to the input of the inverting amplifier 64. Since the feedback signal is 180° out of phase with respect to the input signal from the scanning unit 10, the base line component is cancelled in the adder 63, and an output signal swich consists only of pulses at a constant base level appears at an output terminal 69. DC restoration is, therefore, accomplished by utilizing a negative feedback technique, the restored signal thus produced being a substantially undistorted replica of the signal pulses. The circuit has a wide dynamic range, of the order of 100:1, which is far greater than that of previously known circuits.

Figure 5A:
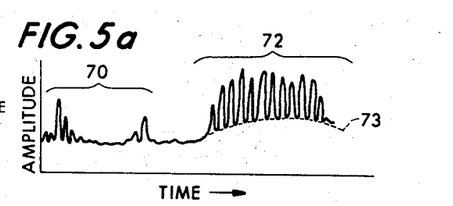
FIGS. 5a and 5b are waveforms illustrating the operation of a DC restorer employed in the normalizing circuitry of FIG. 4.
Figure 5B:
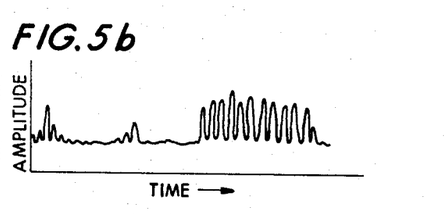

The efficacy of the DC restores circuit 60 in providing DC restoration without distortion of the signals is graphically shown in the curves of FIGS. 5a and 5b which are, respectively, waveforms of the signal from the scanning unit 10 without and with restoration of the signal by the DC restorer circuit of FIG. 4. in FIG. 5a, the group of pulses indicated at 70 are representative of the signals derived from a coded label in the absence of variations in background reflections. The unequal amplitudes of the pulses is characterized of a dirty or otherwise deteriorated label, and the relatively level base line would occur if the label were affixed to a background from which reflections are substantially uniform. It will be evident that DC restoration is not a problem with this group of pulses; however, in a practical system, these pulses must be processed with a minimum distortion by the DC restorer circuitry provided for those signals requiring DC restoration, such as the group of pulses indicated at 72. This portion of the waveform is typical of the signal derived from a new, clean and, hence, highly retro-reflective label under conditions of high ambient light; for example, a bright sunny day with the label affixed to a shiny stainless steel car. Here the coded pulses are of a relative uniform shape, but ride on a relatively slowly-varying base line 73 because of the background light seen by the scanning unit 10. In the illustrated example, the signal pulses vary over an amplitude range of about 20:1 and the amplitude of the base line voltage over a range of about 10:1.

Despite the wide variations in signal characteristics, it will be seen from FIG. 5b that the DC restorer circuit 60 of FIG. 4 is effective to process essentially without distortion the pulses 70 which require little or no DC restoration, and to remove the variations in the base line of the pulses 72 such that all the pulses originate from the same base level. The pulses in the group 72 are also processed substantially without distortion of their shape or amplitude.

After DC restoration, the pulses at the output terminal 69 are applied to the pulse width detector 61 consisting of: a delay line 74 having a first output tap 75 at its center and a second output tap 76 at its far end, the delay at the tap 76 being twice that at the center-tap 75; a pair of attenuators 77 and 78 designed to reduce by half the amplitude of the respective signals applied thereto; an OR circuit 79; and a comparator circuit 80. The restored signals from the DC restorer circuit 60 are applied in parallel to the input terminal of the delay line 74 and through the attenuator 77 to one input terminal of the OR circuit 79. The delayed version of the input signal appearing at the output tap 76 is applied through the second attenuator 78 to the second input terminal of the OR circuit 79. As is well known, the OR circuit produces an output signal when a signal is applied to either of its input terminals. Accordingly, the output of the OR circuit 79 is a pulse of half the amplitude of the input signal, because of attenuation by the attenuators 77 and 78, and wider than the input signal by the amount of the time delay of the delay line 74. This stretched half-amplitude pulse is applied to one input terminal of the comparator 80, and the signal appearing at the center-tap 75 of the delay line 74 is applied to the second input terminal of the comparator 80. For proper operation, the total time delay provided by the time delay line 74 should be approximately equal to the longest expected rise time so that the pulse from the OR circuit 79 reaches its full amplitude before the pulse from the center-tap 75 reaches its half amplitude. In practice, a total delay of about 20 microseconds has been found satisfactory. With the indicated time delay of 20 microseconds, the signal at the center-tap 75 starts 10 microseconds after the start of the stretched pulse and terminates 10 microseconds before the end of the stretched pulse. This relationship of the pulses is indicated in the waveform of FIG. 6 wherein a stretched half-amplitude pulse A is from the output of the OR circuit 79, and a narrower full-amplitude pulse B is from the center-tap 75 of the delay line 74.

Figure 6:
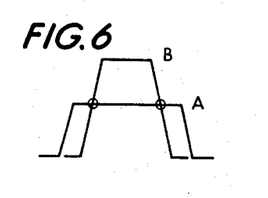
FIG. 6 is an idealized plot of pulse waveforms useful in understanding the operation of a pulse width detector employed in the normalizing circuitry of FIG. 4.

The comparator 80 determines the difference between the pulse from the OR circuit 79 and the delayed pulse from the center-tap 75 and produces a pulse the width of which is determined by the circled points in FIG. 6, which occurs at the midpoint of the signal pulse B regardless of its amplitude. This is accomplished by setting a threshold level in the comparator 80 by the signal from the OR circuit 79. Since this signal from the OR circuit 79 is half the amplitude of the input signal, the pulse from the center-tap 75 triggers the comparator 80 when its leading and trailing edges pass the threshold level. The output of the comparator 80 is a rectangular pulse clipped near the level of the threshold, and having a width determined by the points at which the leading and trailing edges of the signal pulse pass the threshold. Since the threshold is determined by the half-amplitude level of the input signal, the comparator output pulse has a width equal to the mid-point width of the input pulse.

The fact that the pulse at the center-tap 75 starts 10 microseconds after the leading edge of the stretched pulse, and ends 10 microseconds before the trailing edge of the stretched pulse, affords so-called guard bands which prevent small-amplitude signals, which may occur during the 10 microsecond periods preceding and following the signal pulse, from producing an output from the comparator 80. Such signals that might occur during these periods would be due to spurious reflections from black stripes in the label separating the two-stripe combinations of colored stripes. It will be recalled that the black stripes are employed to achieve a clear separation between successive data bits; thus, this feature of the pulse width detection circuit 61 enhances the effectiveness of the black stripe by suppressing signals which may be reflected from these stripes.

Under some circumstances, ambient conditions may cause signals to appear in the orange channel during a period of time that a blue stripe is being read, and vice versa, thereby producing a possible erroneous output pulse which would prevent subsequent correct decoding of the label data. To afford relief from this situation, the pulse width detectors 61 of each channel are cross-connected to provide cross-correlation of the signals being processed in the two channels. The cross-connection is made via a resistor R connected to the output of the OR circuit 79. In this manner, the amplitude of the threshold signal in one channel controls the threshold in the other channel due to the voltage divider formed by resistor R in each channel, together with the resistive components in each circuit. The value of resistance is chosen such that the signals in one channel which are less than a given magnitude relative to signals in the other channel are eliminated.

Figure 7A:
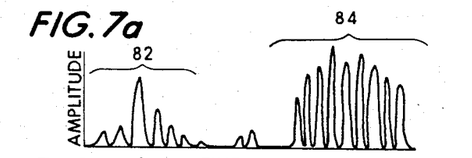
FIG. 7a and 7b are waveforms illustrating the operation of the pulse width detector of FIG. 4.
Figure 7B:
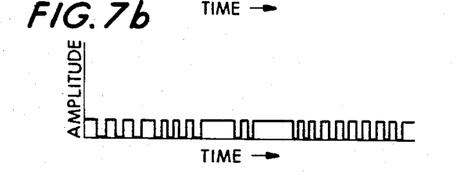

The performance of the pulse width detector 61 is illustrated in FIGS. 7a and 7b wherein the curves of the pulse train from the DC restorer 60 are shown before and after processing by the pulse width detector circuitry under consideration. It will be noted that the signal pulses shown in FIG. 7a vary widely in amplitude and rise time, the pulses of the group designated 82 being on the average of lower amplitude than those in the group designated 84. The first group of pulses 82 are characteristic of signals produced by reflection of light from a dirty or weathered label, while the larger, more uniform pulses 84 are typical of signals produced by reflection from a clean, unweathered label. The variations in rise time are caused by a variety of factors including misalignment of the label relative to the optical system, vibration of the car as it passes the scanner, or changes in focussing of the optical system.

After processing by the pulse width detector 61, the pulses appear as shown in FIG. 7b. For each input pulse, there is a corresponding rectangular output pulse of uniform amplitude with a distinct separation between adjacent pulses. The width of each pulse corresponds to the mid-amplitude width of the input pulse from which it is derived, regardless of the rise time or shape of the input pulse. Thus, uniform, undistorted pulses are produced to facilitate subsequent decoding of the label information.

Before the decoding operation is begun, the pulses from each channel are applied to an integrator 62 which eliminates short noise pulses from the coded pulse train. Since a pulse of ten microseconds is the shortest expected from a label return, any pulses less than this duration are noise signal. The integrator 62 eliminates these short noise pulses by subtracting ten microseconds from each pulse entering the circuit. Thus, the noise pulses do not appear in the coded pulse train.

Figure 8:
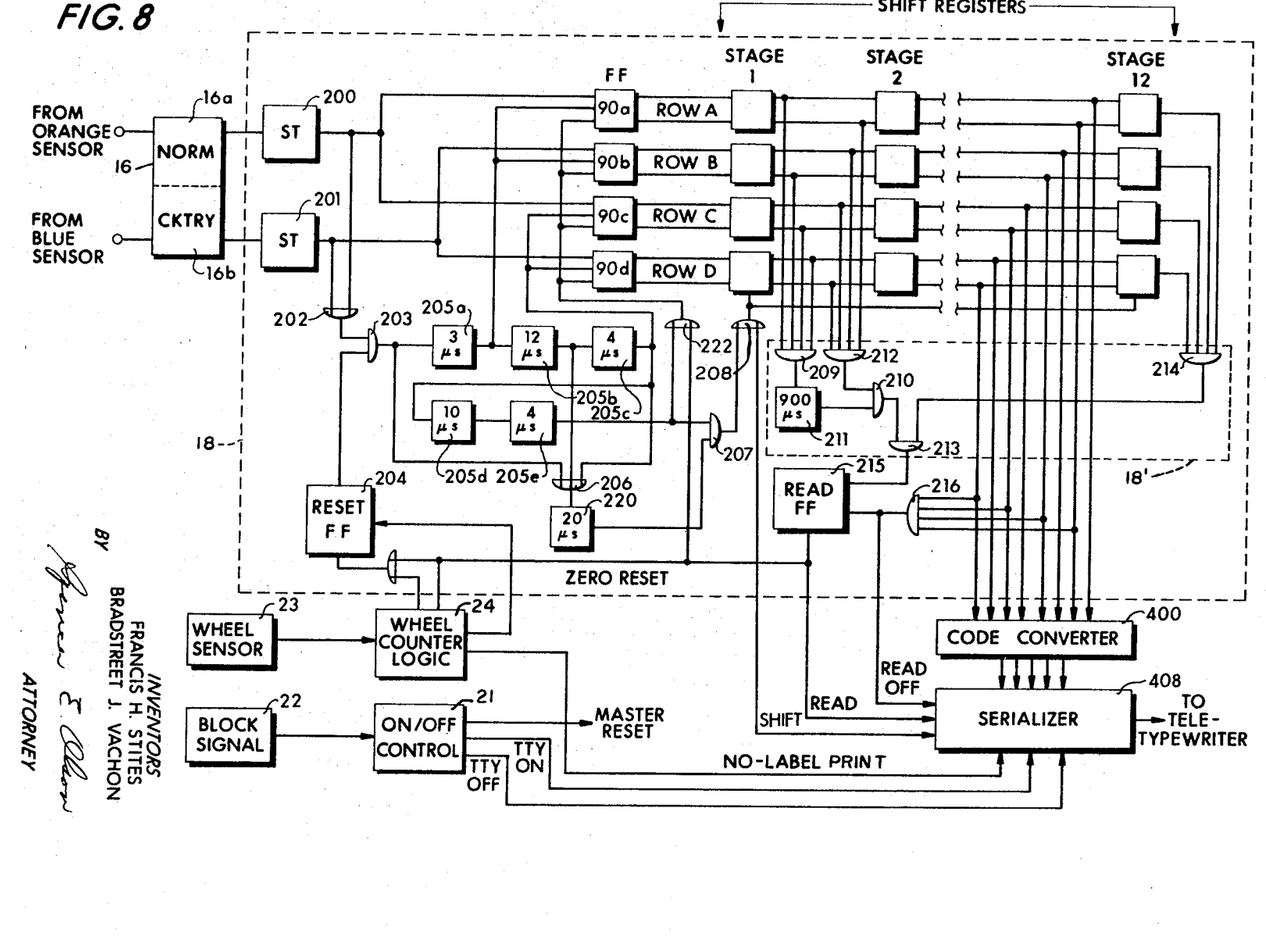
FIG. 8 is a block diagram of decoding logic circuitry, wheel counter logic, code converter, and teletypewriter serializer apparatus employed in the present system.

The normalized signal pulses, which are now of standard amplitude and width and free of extraneous signals, are in suitable form to be expeditiously processed by the decoding logic circuitry 18 shown in FIG. 8 and described in the next section.

DECODING LOGIC CIRCUITRY

Broadly, the decoding logic circuitry 18 of FIG. 8 includes four 12-stage shift registers, appropriate timing circuits, and an acceptance gating arrangement 18' (shown in dotted outline) interconnected therewith. Two shift registers are associated with the orange channel and two with the blue channel to provide the requisite storage capacity to store the label information contained in the base-four code. More particularly, the shift registers of row A and row C are connected to the orange channel while the shift registers from row B and row D are connected to the blue channel. In the present embodiment, a ten digit label format is used; however, the twelve-stage shift registers are provided to store the "start" and "stop" signal pulses in addition to the ten label digits. Although a twelve-stage register is employed in the present embodiment, it is to be emphasized that the label can be of any length to suit a particular operating situation. Accordingly, the decoding logic circuitry can be designed to accommodate any label length as the case may require. As shown in FIG. 8, the decoding logic circuitry 18 is operated by the normalizing circuitry 16 and also by the wheel sensor 23 and associated wheel counter logic 24. A code converter 400 is operated by the decoding logic circuitry 18, and a serializer 408 is operated by the decoding logic circuitry 18, the code converter 400, and by the block signal 22 and the associated ON/OFF control 21.

In general, the equipment of FIG. 8 operates in the following manner. When a train enters the signal block, the block signal 22 activates the power sources (not shown) which energize the various circuits. Random data is prevented from entering the decoding logic circuitry 18 until the first wheel of the first car passes the wheel sensor 23. When the label 12 is in the field of view of the scanning unit 10 the first portion of the label that is scanned is the wide white stripe 25 located at the bottom of the label preceding the "start read" code. This produces a relatively large amplitude signal pulse in both the orange and blue channels 16a and 16b and is applied via associated Schmitt trigger circuits 200 and 201 to four flip-flops 90a–90d to clear any extraneous data that may be present. As the scanner included in the scanning unit 10 scans the remainder of the label 12, signal pulses produced by light reflected back from the coded stripes are sequentially loaded into the shift registers. As previously stated, the label stripes are 3/8″ in width and the scanning wheel within the scanning unit 10 rotates at 1200 r.p.m., establishing the criterion that no signal pulse from any stripe should exceed 20 microseconds.

It is a significant feature of the present system that the speed of the scanning wheel determines system timing, rather than system timing being determined by the variable speed of a vehicle passing the scanning station as in conventional systems. Furthermore, the two-stripe coded combinations initiate their own enabling gates by means of a sequential chain of five multivibrators 205a–205e. As a consequence, the label need not be one continuous sequence of evenly-spaced stripes, but component pairs of stripes may be separated from each other to suit the structural configuration of the side of a particular labeled car.

The leading edge of a pulse from the first stripe of a two-stripe combination causes a gate pulse to be generated of a duration equivalent to the duration of a signal pulse expected during this time interval. A second gating pulse is also generated which brackets the time interval during which a signal pulse from the second stripe of the two stripe combination is expected. In this manner, extraneous information is prevented from being processed since pulses are not accepted for processing if they are too long. Since a true signal pulse must occur within the time spanned by the corresponding acceptance gate, only valid signal pulses will be loaded into the shift registers; noise pulses which generally are longer in duration than the longest expected signal pulse are thereby prevented from entering the data registers.

As the label data is sequentially loaded into the shift registers, the acceptance gating arrangement 18' determines whether the information applied to the storage shift registers is properly that derived from a label under scan only. More specifically, upon the receipt of a "start" pulse, an acceptance gate interval is generated by the acceptance gating arrangement 18' during which all of the label information is expected to be received. Both the "start" pulse and the "stop" pulse together with the ten label digits must be present during the time interval generated by the acceptance gating arrangement 18' in order for the label to be accepted for print-out. Extraneous data occurring between cars is prevented from being processed by a command from the wheel counter logic 24. The wheel counter logic 24 also provides a signal to the output circuitry in the event that a car passes without a label or with an unreadable label. The output circuitry, in response to this signal, can then print an appropriate symbol indicating an unread car. The equipment is turned off after the train has left the signal block, and will remain off until the appearance of another train within the block.

The loading sequence of signal pulses into the shift registers is as follows: the normalized signal pulses from the normalizing circuitry channels 16a and 16b are applied to the respective Schmitt triggers 200 and 201 which are responsive to signal pulses from the orange and blue channels, respectively. The Schmitt trigger 200 applies signals from the orange channel to the shift registers in row A and row C, while the Schmitt trigger 201 applies signals from the blue channel to the shift registers in row B and row D. A pulse from the Schmitt trigger 200 sets the flip-flops 90a and 90c, while a pulse from the Schmitt trigger 201 sets the flip-flops 90b and 90d. Pulses from the Schmitt triggers 200 and 201 are also applied to an OR gate 202, the output pulse of which is applied to one input terminal of an AND gate 203. The other input of the AND gate 203 is a signal from a reset flip-flop 204 which enables an output pulse from the AND gate 203 to be applied to a bank of one-shot multivibrators 205a–205e. As will be discussed hereinafter, the reset flip-flop 204 can be enabled by command from the wheel counter logic 24 or by command from a read flip-flop 215.

The output terminal from the AND gate 203, and the output terminals of the one-shot multivibrators 205b and 205c are each connected to respective input terminals of an OR gate 206. Each of the one-shot multivibrators 205a–205e produces a pulse the trailing edge of which sequentially triggers the next succeeding one-shot multivibrator. Also, the first one-shot multivibrator 205a produces a pulse the trailing edge of which sets the flip-flops 90a and 90b. The third one-shot multivibrator 205c produces a pulse the trailing edge of which triggers the flip-flops 90c and 90d.

The one-shot multivibrators 205a–205e assure that the signal pulses from the first and second label stripes of each two-stripe combination are applied to the proper registers. The flip-flops 90a and 90b, which store the signal pulses from the first label stripe, are enabled by a pulse from the one-shot multivibrator 205a. It will be recalled that 10 microseconds are effectively subtracted from each signal pulse by the integrator 62 in the normalizing circuitry 16 of FIG. 4. Thus, the signal pulses received by the decoding logic circuitry 18 represent signal returns from approximately the center of each label stripe since each stripe produces a signal pulses of a maximum duration of 20 microseconds with the indicated label size and scanning rate. An additional 3 microseconds delay is provided by the one-shot multivibrator 205a to insure that the scanner has scanned well into the first stripe before the signal return from this stripe is stored. In like manner, the flip-flops 90c and 90d, which store the signal pulses from the second label stripe, are enabled by a pulse from the one-shot multivibrator 205c which together with the one-shot multivibrator 205b provides a time delay of 16 microseconds after the loading pulse from the first one-shot multivibrator to insure that the signal return is in fact a signal pulse from the second stripe. The leading edge of the pulse from the one-shot multivibrator 205e shifts the data from the flip-flops 90a–90d in the first stage of the shift registers by means of an AND gate 207 and an OR gate 208. The trailing edge of this pulse from the one-shot multivibrator 205a resets the flip-flops 90a–90d via an OR gate 222 so that the next set of scanned data can be loaded. An enabling signal from the OR gate 206 triggers a one-shot multivibrator 220 to generate a signal which in turn enables the AND gate 207 so that the shift pulse can occur only if all data has proper length.

This same sequence of operations is continued for each signal pulse returned from the label. In the well-known manner, the data in the shift registers is advanced by one stage as new data is entered into the registers. When the contents of the entire label has been entered into the shift registers, the data stored in the registers is tested to determine whether the data is that of a label as follows: an AND gate 209 which is responsive to a "start" pulse, triggers a one-shot multivibrator 211 upon the receipt of a "start" pulse in the first stage of the registers. The multivibrator 211 produces a gating pulse 900 microseconds long, a duration slightly in excess of the time required to scan the label. At a scanning speed of 1200 revolutions per minute, coded stripes of ⅜ inch width, and black separation stripes of ½ inch width, the time to scan the entire label is 810 microseconds (20 microseconds each for the 24 coded stripes, and 30 microseconds each for the 11 spacer stripes).

The gating pulse from the multivibrator 211 is applied to one input of an AND gate 210, the other input being an enabling pulse from an AND gate 212 which is responsive to a "stop" pulse. Thus, a "stop" pulse entering the first stage of the shift registers must occur within the duration of the 900 microsecond acceptance gate time interval in order to actuate the AND gate 210. An additional test of whether the data is that of a label is provided by an AND gate 214 which is responsive to a "start" pulse appearing in the last stage of the shift registers. The output of the AND gate 214 is applied to one input of an AND gate 213, the other input of which is the output pulse from the AND gate 210. It is evident that the AND gate 213 will be enabled only if the output pulses of the AND gates 210 and 214 coincide in time. In this manner, information contained in the shift registers will not be read out unless a "start" and a "stop" pulse with ten digits located therebetween are present in the shift registers.

When the presence of label data in the shift registers in verified, the AND gate 213 produces a pulse which enables the read flip-flop 215, the second input of which is a pulse from an AND gate 216 produced by the presence of signal pulses in the registers. The read flip-flop 215 produces a signal which actuates the serializer 408 to allow data to be read out to a teletypewriter or other suitable readout device. The signal data itself is applied sequentially from the registers to the code converter 400 which transforms the four-level parallel data to a five-level parallel code suitable for operating a teletypewriter, and thence to the serializer 408 which transforms the parallel code to a serial code necessary to actuate the teletypewriter. The operation of the output equipment will be further discussed hereinafter.

The effectiveness of the system is enhanced by wheel counting apparatus which causes the readout device to produce a suitable indication when an unlabeled car or a car with an unreadable label passes the scanner. This apparatus, shown in greater detail in FIG. 9, includes the wheel counter logic 24, the ON/OFF control 21 and the wheel sensor 23. The wheel sensor 23 is a magnetic sensing coil located near the track and produces a pulse on the passage of a wheel, these pulses actuating the wheel counter logic 24. The ON/OFF control 21 provides signals to energize the teletypewriter printer. These signals, designated TTY ON and TTY OFF, turn the printer on and off, respectively, when a train enters and leaves the signal block. A "Master Reset" pulse is also provided by the ON/OFF control 21 to reset the logic circuitry when a train has passed the scanner. Standard railroad cars have four axles, and to simplify the logic to be described, the coded labels are placed on the car side between the first and third axles as counted from the left-hand side. An indication of an unlabeled car is, therefore, available, if seven wheels pass the scanning station without a label readout. The counter logic includes a binary counter 303 having three binary outputs $2^0$, $2^1$ and $2^2$ and three reset inputs designated "three reset," "two reset" and "zero reset," and a pair of coincidence gates 304 and 305. The $2^0$ and $2^1$ binary outputs are connected to the AND gate 305, while all three binary outputs are connected to the AND gate 304; thus, the AND gates 303 and 304 indicate, respectively, a count of three and a count of seven. The output of the AND gate 304 is connected to the "no-label" character indication in the output apparatus, and is also connected to the "three reset" input of the binary counter 303 to reset the counter to a count of three when a no-label signal occurs.

In operation, when a train enters a signal block, the block signal 22 energizes the ON/OFF control 21 which, in turn, energizes the binary counter 303, setting it to a count of two. As the first wheel of the first car is sensed, the counter 303 is advanced to a count of three to insure a no-label readout in the event of an unlabeled first car, since the counter would advance to a count of seven as the second car passes the scanner thereby producing a no-label signal. Pulses from the wheel sensor 23 advance the counter 303 by a count of one each time a wheel passes. When a label is read, a pulse from the read flip-flop 215 resets the counter 303 to zero via the "zero reset" line. A reset flip-flop 204 is set by a pulse from the AND gate 305 to inhibit data until a count of three is present. When no label is read, the counter 303 is reset to three so that a no-label signal will be produced when the count advances to seven or the passage of the next car. If no label is present on the last car, the counter 303 will have advanced to a count of five or six; however, there is no succeeding car to advance the count to seven to produce the no-label signal. Therefore, the no-label indication is produced for an unlabeled last car by the de-energizing circuit in the ON/OFF control 21.

Figures 10, 11:
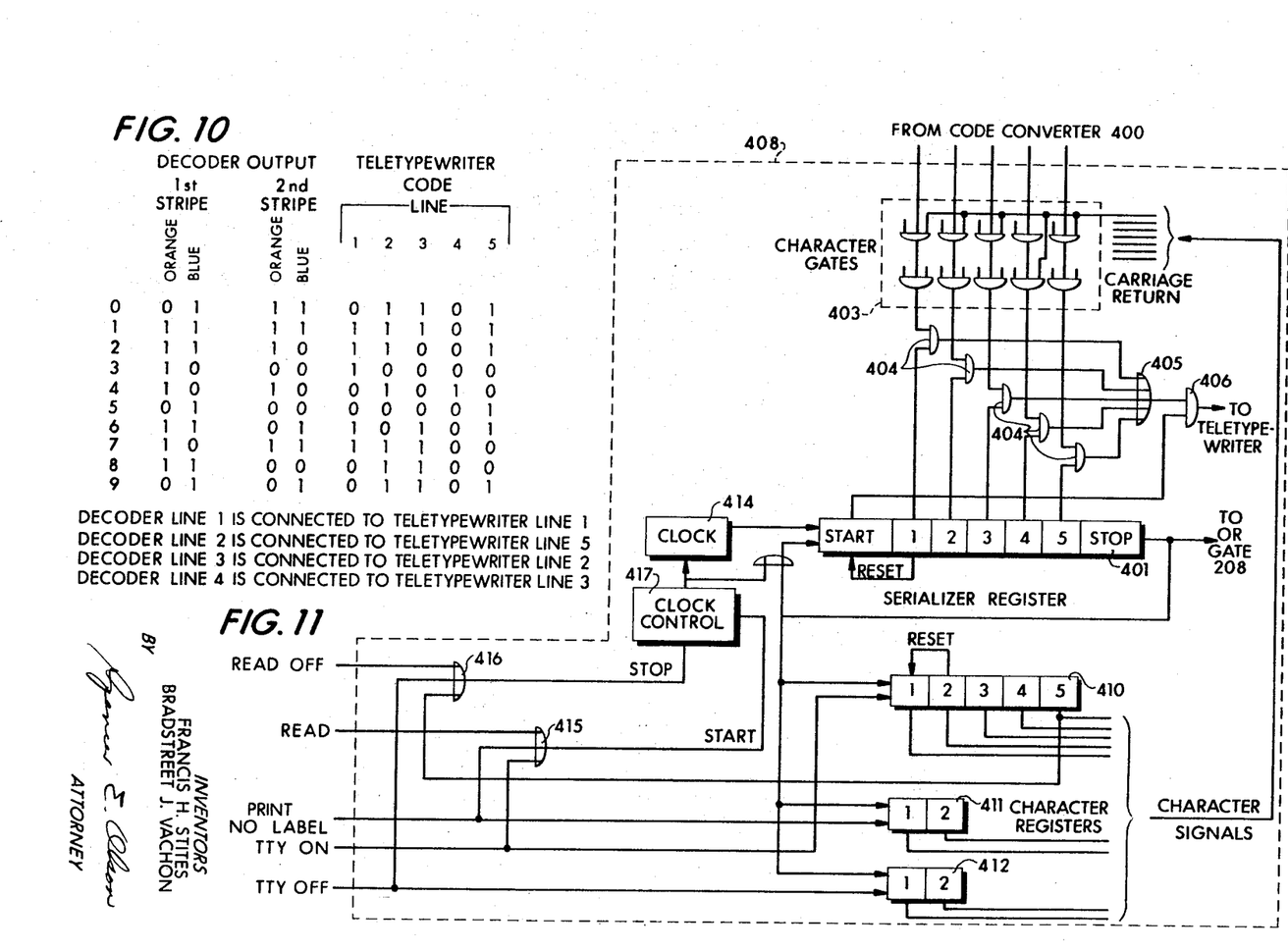
FIG. 10 is a table useful in understanding the operation employed in the code converter of FIG. 8.
FIG. 11 is a block diagram of a teletypewriter serializer apparatus employed in FIG. 8.

Since teletypewriter equipment is commonly employed in railroad signal systems, it is advantageous to utilize available equipment to print out label data. In order to utilize this teletypewriter equipment, the four-level data from the decoding logic circuitry 16 must be converted to a five-level parallel format and then serialized to produce the required code configuration to properly operate a teletypewriter. As previously mentioned, conversion to a five-level parallel format is accomplished by the code converter 400, typically a converter matrix, the function of which is best explained by reference to FIG. 10. The four decoder output lines are connected to the five teletypewriter lines as shown in the table of FIG. 10; the decoder output line 1 is connected to the teletypewriter line 1, and the decoder lines 2, 3 and 4 are connected respectively to the teletypewriter lines 5, 2 and 3. It is a significant feature of the invention that the four-level decoder output can be directly converted to five-level teletypewriter form, with the exception of three digits which require additional conversion to fit the intended code. Thus, the cost and complexity of code conversion apparatus is reduced by virtue of the judicious arrangement of the decoder output code. A study of the logic tables of FIG. 10 will show the direct relation of the four-line output to five-line teletypewriter form, except for the digits 4, 8 and 9. These three digits are suitably transposed in the code converter 400 to produce the desired coded output.

The five-level parallel code is converted to serial form by the serializer 408, shown in detail in FIG. 11. The serializer 408 including a serializer register 401, three character registers 410, 411 and 412 a clock 414, a clock control 417, and various control gates 403–406, 415, 416, and 418. Characters stored in the character registers 410–412 provide control signals necessary to operate the teletype-writer, such as "carriage return," "start" and "stop" signals, and "no-label" indication. These characters are applied as needed to the character gates 403 so that the character will appear in the serialized output signal to suitably control the teletypewriter. The outputs of the character registers 410–412 are applied to appropriate input terminals of the character gates 403. As an example, the connections to the character gates 403 are shown for applying a "carriage return" symbol to the coded output signal of the serializer. Each of the data lines from the code converter 400 is connected to one input terminal of a respective character gate 403 the output of which is connected to one input of a respective gate 404. The gates 404 are sequentially energized by clock pulses from the clock 414 which provides a recirculating logic level in the serializer register 401 thereby allowing the data from the code converter 400 to be applied to corresponding inputs of and OR gate 405 the output of which is gated out via an AND gate 406, the serialized data output being of the form required to control a teletypewriter.

In operation, the teletypewriter is turned on by a signal from the ON/OFF control 21 which energizes the character register 410 to generate an appropriate "turn on" signal (TTY ON). This signal is also applied via an OR gate 415 to the clock control 417 which in turn energizes the clock 414. The clock control 417 is provided to adjust the speed of the clock to a rate compatible with the printing rate of a particular teletypewriter. Data read from the label is transformed into serial form in the manner explained above and is applied to the teletypewriter which prints out the decoded label information. In the event of an unlabeled car, or a car having an unreadable label, a NO LABEL signal produced by the wheel counter logic 24 is applied to the character register 411 containing the NO LABEL symbol which causes this symbol to be applied to appropriate input terminals of the character gates 403 thereby allowing this symbol to appear at the serializer output and to be printed by the teletypewriter. After all data has been read from the decoding logic circuitry, a signal designated READ-OFF is produced by the AND gate 216 (FIG. 8) which is applied via the OR gate 416 to stop the clock control 417 and the clock 414. When the train leaves the block, the ON/OFF control 21 produces a signal (TTY OFF) which turns off the teletypewriter by energizing the character register 412 containing the turn off symbol. The TTY OFF signal is also applied via the OR gate 416 to assure that the clock control 417 and clock 414 are de-energized. At this time, the ON/OFF control 21 also produces a "master reset" pulse to reset the decoder logic circuitry 16 so that it is in condition to accept label data when another labeled train arrives at the scanning station.

From the foregoing, it is evident that a very reliable and accurate mark sensing system has been provided which is operable under all types of climatic conditions, is indpendent of the rate of label motion past the reader, and which is compatible with a five-position teletypwriter code. A significant feature of the system is that label data is not entered into the decoding logic circuitry until it has been determined that the received data is in fact a signal pulse, as opposed to noise. It is another significant feature that information stored in the data registers is not read out until it has been ascertained that the information stored in the data registers is that derived from a label. Thus, label data that is read out is extremely reliable since spurious signals which possibly could be received by the decoding circuitry are not accepted for processing. Although a preferred embodiment of the invention has been shown and described, modifications and alternative implementations will occur to those skilled in the art without departing from the true scope of the invention. Accordingly, the invention is not limited by what has been particularly shown and described except as indicated in the appended claims.

What is claimed is:

1. Apparatus for identifying a vehicle in motion along a horizontal path past a scanning station comprising, a vertical array of substantially-parallel horizontal reflective stripes carried by the vehicle to be identified, said stripes being of four different colors and arranged in a two-position base-four code to define alpha-numeric data unique to the vehicle, means for scanning said stripes with a light beam in a substantially vertical direction at a rate independent of the rate of motion of said vehicle, means arranged to receive light reflected from the stripes, said means being operative in response to light received after reflection from said stripes to produce electrical signals representative of the data encoded in the array of stripes, storage means for storing said electrical signals, means operative in response to one of the electrical signals to generate an acceptance gating signal of a predetermined time duration, and means operative in response to said acceptance gating signal and to a subsequent one of said electrical signals to cause said electrical signals stored in said storage means to be applied to an output connection only if the time duration of the electrical signals between the beginning of said one of said electrical signals and the termination of said subsequent one of said electrical signals is equal to the predetermined time duration of said acceptance gating signal.

2. Apparatus for identifying a vehicle in motion along a horizontal path past a scanning station comprising, a vertical array of substantially-parallel horizontal reflective stripes carried by the vehicle to be identified, said stripes being of four different colors and arranged in a two-position base-four code to define alpha-numeric data unique to the vehicle, means for scanning said stripes with a light beam in a direction substantially vertical and at a uniform rate independent of the rate of motion of said vehicle, means arranged to receive light reflected from the stripes, said means being operative in response to light received after reflection from said stripes to produce a train of electrical pulse signals representative of the data encoded in the array of stripes, storage means for storing said train of electrical pulse signals, means operative in response to the first pulse signal in said train of electrical pulse signals to generate an acceptance gating signal of a time duration substantially equal to the time duration of said train of electrical pulse signals, and means operative in response to said acceptance gating signal and the last pulse signal in said train of electrical pulse signals to cause said train of electrical pulse signals stored in said storage means to be applied to an output connection only if the time duration of said train of electrical pulse signals and the time duration of said acceptance gating signal coincide.

3. Apparatus for identifying a vehicle in motion along a horizontal path past a scanning station comprising, a vertical array of substantially-parallel horizontal reflective stripes carried by the vehicle to be identified, said stripes being of four different colors and arranged in a two-position base-four code to define alpha-numeric data unique to the vehicle, means for scanning said stripes with a light beam at a uniform rate independent of vehicle speed in a substantially vertical direction, signal translating means arranged to receive light reflected from the stripes, said signal translating means being operative to generate a train of electrical pulse signals in response to light received after reflection from said stripes, and signal processing apparatus for decoding the data content of the train of electrical pulse signals derived from scanning said array of stripes, said signal processing apparatus including pulse signal storage means, means for sequentially applying the pulse signals of said pulse signal train to said pulse signal storage means, means responsive to the first pulse signal of said train of pulse signals to initiate generation of an acceptance gate pulse signal of a time duration substantially equal to the expected time duration of said train of pulse signals, and coincidence gate means adapted to receive said acceptance gate pulse signal and the last pulse signal in said pulse signal train and operative in response to the occurrence of said last pulse signal during the period of said acceptance gate pulse signal to allow said train of pulse signals stored in said pulse signal storage means to be applied to a readout device.

4. Apparatus for identifying a vehicle in motion along a horizontal path past a scanning station comprising, a vertical array of substantially-parallel horizontal reflective stripes carried by the vehicle to be identified, said stripes being of four different colors and arranged in a two-position base-four code to define alpha-numeric data unique to the vehicle, means for repetitively scanning said stripes with a light beam at a uniform rate independent of vehicle speed in a substantially vertical direction, signal translating means arranged to receive light reflected from the stripes, said signal translating means being operative to generate a train of electrical pulse signals in response to light received after reflection from said stripes, and signal processing apparatus for decoding the data content of the train of electrical pulse signals derived from scanning said array of stripes, said signal processing apparatus including a plurality of storage registers, means for applying said pulse signals to selected storage registers depending upon the color of each of the stripes being scanned, the pulse signals derived from the stripes being applied in succession to the plurality of storage registers, means responsive to the first pulse signal in said train of pulse signals to initiate generation of an acceptance gate pulse signal of a time duration substantially equal to the expected time duration of said train of pulse signals, coincidence gate means operative to receive said acceptance gate pulse signal and the last pulse signal of said pulse signal train and operative to produce an output signal in response to the occurrence of said last pulse signal during the period of said acceptance gate pulse signal, and means responsive to said output signal to allow said train of pulse signals stored in said storage registers to be applied to a readout device.

5. A system for identifying a vehicle in motion along a horizontal path past a scanning station comprising, a vertical array of substantially-parallel horizontal reflective stripes carried by the vehicle to be identified, said stripes being of four different colors and arranged in a two-position base-four code to define alpha-numeric data unique to the vehicle, means for scanning said stripes with a light beam at a uniform rate independent of vehicle speed in a substantially vertical direction, signal translating means arranged to receive light reflected from the stripes, said signal translating means being operative to generate electrical pulse signals in response to light received after reflection from said stripes, means for normalizing said pulse signals, signal processing means for processing said normalized pulse signals, and operative to decode the data content of the normalized pulse signals and to produce a decoded signal representative of the decoded content, said signal processing means including a storage means for storing said decoded signal, means operative to determine whether the decoded signal has been derived from the array of strikes under scan only, and means operative to cause said decoded signal stored in said storage means to be applied to an output connection only if it is determined that the decoded signal has been derived only from the array of stripes.

6. An electro-optical mark sensing system comprising, a coded label fabricated of retro-reflective material and containing coded data, apparatus for optically scanning said label, sensors operative in response to light reflected from said label to produce a train of signal pulses representative of said coded data, first circuit means for eliminating variations in the base line component of said signal pulses caused by variations in ambient light received by said sensors, second circuit means coupled to said first circuit means and operative to produce a train of output pulses having a width equal to the mid-amplitude width of corresponding input signal pulses, a signal processor operative to decode the data content of the train of output pulses produced by said second circuit means, said signal processor including means responsive to selected pulses of said train of output pulses corresponding to a stripe under scan to generate a first gate pulse of a time duration substantially equal to that of the longest signal pulse expected to be derived from the stripe under scan, a plurality of multi-stage storage registers, means for sequentially applying the pulses of said train of output pulses to said storage registers only if each pulse of said train of pulses occurs within the time duration of its respective first gate pulse, means responsive to the first group of pulses applied to the first stages of the storage registers to generate an acceptance gating pulse of a time duration substantially equal to that of the expected time duration of said pulse train, coincidence gate means operative in response to said acceptance gating pulse and the last group of pulses applied to the first stages of the storage registers to produce an enabling signal when the last group of pulses occurs within the time duration of said acceptance gating pulse, and means operative in response to said enabling signal and the first group of pulses to apply said train of output signals stored in said storage registers to a readout device.

7. Apparatus for identifying a vehicle in motion along a horizontal path past a scanning station comprising, a vertical array of substantially-parallel horizontal reflective stripes carried by the vehicle to be identified, said stripes being of four different colors and arranged in paired combinations in a two-position base-four code to define alpha-numeric data unique to the vehicle, each two-stripe pair being separated from the adjacent two-stripe pair by a substantially non-reflective spacer of a vertical width approximately equal to the vertical width of the stripes, an additional first pair of reflective stripes at one end of said array for initiating processing of the data content of the label, an additional second pair of reflective stripes at the other end of said array for terminating processing of the data content of the label, means for scanning said stripes with a light beam in a substantially vertical direction at a uniform rate independent of the rate of motion of said vehicle, signal translating means arranged to receive light reflected from the stripes, said signal translating means being operative to generate a train of electrical pulse signals in response to light received after reflection from said stripes, said additional first pair of stripes being operative to produce the first pulse signal in said train of pulse signals, said additional second pair of stripes being operative to produce the last pulse signal in said train of pulse signals, signal processing means for processing said train of pulse signals to decode the data content of the train of pule signals to produce a decoded signal representative of the data content, storage means included in said signal processing means for storing said decoded signal, means responsive to said first pulse signal for generating an acceptance gating signal of a time duration substantially equal to that of said train of pulse signals, and means responsive to said acceptance gating signal and said last pulse signal to cause said decoded signal stored in said storage means to be applied to a readout device only if the time duration of said pulse signal train and said acceptance signal coincide.

8. Apparatus for identifying a vehicle in motion along a path past a scanning station comprising: an array of parallel reflective stripes carried by the vehicle, said stripes being arranged in a predetermined coded pattern; means for scanning said stripes in succession with a light beam; means arranged to receive light reflected from the stripes and operative in response to light received after reflection from said stripes to produce electrical signals representative of the information encoded in said array of stripes; storage means for storing said electrical signals; means operative to compare the time duration of the electrical signals with a predetermined time duration; and means operative to cause said electrical signals stored in said storage means to be applied to an output connection if the time duration of the electrical signals coincides with the predetermined time duration.

9. Apparatus for identifying a vehicle in motion along a path past a scanning station comprising: an array of prallel reflective stripes carried by the vehicle, said stripes being arranged in a predetermined coded pattern; means for scanning said stripes in succession with a light beam; means arranged to receive light reflected from the stripes and operative in response to light received after reflection from said stripes to produce successive electrical signals representative of the information encoded in said array of stripes; storage means for storing said electrical signals in succession; means operative in response to one of the electrical signals to generate an acceptance gating signal of a predetermined time duration; and means operative in response to said acceptance gating signal and a subsequent one of said electrical signals to allow said electrical signals stored in said storage means to be applied to an output connection only if the time duration of the electrical signals between the beginning of said one of the electrical signals and the termination of said subsequent one of said electrical signals coincides with the predetermined time duration of the acceptance gating signal.

References Cited

UNITED STATES PATENTS

| 2,273,477 | 2/1942 | Thompson et al. | |
| 3,145,291 | 8/1964 | Brainerd. | |
| 3,225,177 | 12/1965 | Stites et al. | 235—61.115 |
| 3,299,271 | 1/1967 | Stites | 250—219 |
| 3,328,590 | 6/1967 | Kapsambelis | 250—219 |

MAYNARD R. WILBUR, *Primary Examiner.*

SOL SHEINBEIN, *Assistant Examiner.*